US012496515B2

(12) United States Patent
Yang

(10) Patent No.: US 12,496,515 B2
(45) Date of Patent: Dec. 16, 2025

(54) GAMEPAD

(71) Applicant: GUANGZHOU LIYANG TECHNOLOGY CO., LTD., Shenzhen (CN)

(72) Inventor: Yumei Yang, Shenzhen (CN)

(73) Assignee: Shenzhen Jieruihong Electronics Co., Ltd., Shenzhen (CN)

( * ) Notice: Subject to any disclaimer, the term of this patent is extended or adjusted under 35 U.S.C. 154(b) by 294 days.

(21) Appl. No.: 18/510,118

(22) Filed: Nov. 15, 2023

(65) Prior Publication Data

US 2025/0153038 A1 May 15, 2025

(51) Int. Cl.

*A63F 13/24* (2014.01)
*F21V 19/00* (2006.01)
*F21Y 113/13* (2016.01)
*F21Y 115/10* (2016.01)

(52) U.S. Cl.

CPC .......... *A63F 13/24* (2014.09); *F21V 19/0015* (2013.01); *F21Y 2113/13* (2016.08); *F21Y 2115/10* (2016.08)

(58) Field of Classification Search

CPC .. A63F 13/24; F21V 19/0015; F21Y 2113/13; F21Y 2115/10

See application file for complete search history.

(56) References Cited

FOREIGN PATENT DOCUMENTS

CN 217567399 U * 10/2022

OTHER PUBLICATIONS

ESPACE translation of CN217567399U (Year: 2025).*

* cited by examiner

*Primary Examiner* — Peter J Iannuzzi

(74) *Attorney, Agent, or Firm* — Daniel M. Cohn; Howard M. Cohn

(57) ABSTRACT

The present disclosure provides a gamepad, comprising: a PCB circuit board, a transparent colloid, a key dial assembly and a transparent button; the PCB circuit board is provided with a button position and LED lamp beads arranged at the button position; the transparent colloid is arranged on the button position; the key dial assembly comprises a support member fixed on the PCB circuit board, a dial rotatably connected to the support member and a gear set meshingly connected to the dial; the dial is arranged on the transparent colloid; the dial is provided with several first transparent holes and second transparent holes adjacent to each of the first transparent holes; the first transparent holes and the second transparent holes correspond to the switching of the button position on the PCB circuit board when the dial is rotated with the axis of the support member.

10 Claims, 4 Drawing Sheets

GAMEPAD

TECHNICAL FIELD

The present disclosure relates to a technical field of game controller, and in particular to a gamepad.

BACKGROUND

The ABXY button layout and functions of game controllers on the market are fixed and cannot be changed. For example, the button layout of the game console Switch launched by Nintendo is different from that of the game console XBOX launched by Microsoft, mainly reflected in the ABXY button of the game console. Moreover, the functions and operation methods of the ABXY buttons on different game consoles are also different, which leads to the need for one-to-one correspondence between game controllers on different game consoles, which is to some extent wasteful. Therefore, there is an urgent need to introduce a game controller that can be applied to different game consoles.

SUMMARY

In order to solve the problem of limited usage scenarios of existing gamepad, the present disclosure provides a gamepad. The gamepad, comprising: a PCB circuit board, a transparent colloid, a key dial assembly and transparent buttons.

The PCB circuit board is provided with a button position and LED lamp beads arranged at the button position; the transparent colloid is arranged on the button position; the key dial assembly comprises a support member fixed on the PCB circuit board, a dial rotatably connected to the support member and a gear set meshingly connected to the dial; the dial is arranged on the transparent colloid; the transparent buttons are arranged above the dial and remain relatively stationary with the dial; the dial is provided with several first transparent holes and second transparent holes adjacent to each of the first transparent holes; the first transparent holes and the second transparent holes correspond to the switching of the button position on the PCB circuit board when the dial rotates around the axis of the support member.

The present disclosure has beneficial effects as follows.

The gamepad comprises a key dial assembly. Specifically, the dial in the key dial assembly is provided with several first transparent holes and second transparent holes adjacent to each of the first transparent holes; the first transparent holes and the second transparent holes correspond to the switching of the button position on the PCB circuit board when the axis of the dial is rotated with the axis of the support member. The first transparent holes or second transparent holes corresponding to the LED lamp beads transmission is mapped with the corresponding button pattern on the corresponding transparent buttons to enable switching of button types on the transparent buttons, ultimately adapting to different types of game consoles.

Furthermore, the circumferential sidewall of the dial is provided with a tooth structure that meshes with the gear set.

Furthermore, the dial comprises the body of the disc and a gear component coaxial with the body of the disc; the body of the disc is provided with several first transparent holes and second transparent holes; the gear components are meshedly connected to the gear set, and drive the body of the disc to rotate coaxially.

Furthermore, the gamepad comprises a shell, and the shell is provided with a through hole communicated externally; the gear set comprises a first sub-gear that is pivoted inside the shell and partially placed outside the through hole, and comprises a second sub-gear connecting the first sub-gear and the dial.

Furthermore, the support member comprises a support body fixed on the PCB circuit board and support arms arranged on opposite sides of the support body. The body of the disc rotates around the axis around the support body and the support arms.

Furthermore, the support body is provided with at least two positioning holes, and the PCB circuit board is equipped with positioning columns that are suitable for the positioning holes.

Furthermore, the PCB circuit board is equipped with a switch, and the LED lamp beads are colorful LED lamp beads; the switch is electrically connected to the colorful LED lamp beads; the switch is turned on or off with the rotation of the dial to enable the switching of the colorful LED lamp beads between different colors.

Furthermore, the number of button positions is four, and each button position is distributed in a cross-shaped; the number of first transparent holes and second transparent holes is both four.

Furthermore, the gamepad also comprises a light guide plate, which is located between the transparent colloid and the dial.

Furthermore, the light guide plate is in a cross-shaped and corresponds to each of the button position.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
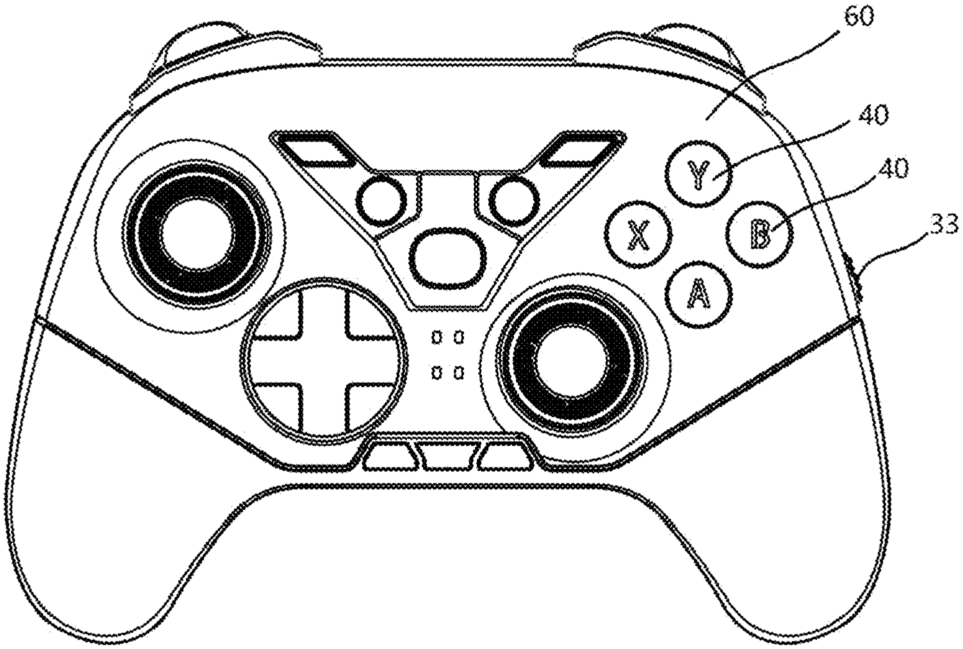
FIG. 1 is a front elevational view of the gamepad.

Reference number in the drawings:

| | | | |
|---|---|---|---|
| PCB circuit board | 10 | button positions | 10a |
| LED lamp beads | 10b | key dial assembly | 30 |
| support member | 31 | dial | 32 |
| first transparent holes | 32a | second transparent holes | 32b |
| gear set | 33 | support body | 311 |
| dental structure | 321 | positioning holes | 31a |
| support arms | 312 | second sub-gear | 332 |
| first sub-gear | 331 | transparent buttons | 40 |
| light guide plate | 50 | shell | 60 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In the description of the present disclosure, it should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include at least one feature. In the description of the present disclosure, the meaning of "a plurality of" is at least two, unless otherwise specified.

In the present disclosure, the terms such as "mounting", "connected", "connected to", "fixed at", and the others should be understood in a broad sense unless expressly stated or limited otherwise; for example, it may be a fixed connection or a detachable connection, or integrated; it can be a mechanical connection or an electrical connection; it can be a direct connection or an indirect connection through an intermediate medium, and it can be the internal connection of the two elements or the interaction relationship between the two elements. For a person having ordinary skill in art, the specific meanings of the above terms in the present invention can be understood according to specific situations.

In order to make the purpose, technical solutions, and advantages of the present disclosure clear, the following further describes the present disclosure in detail with reference to accompanying drawings and embodiments.

Figure 2:
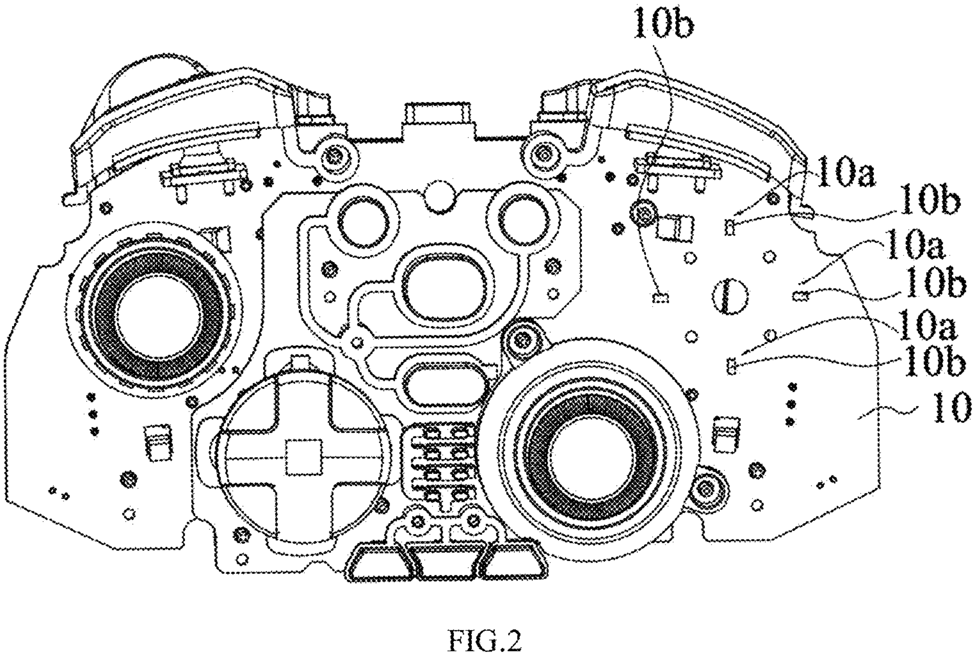
FIG. 2 is a schematic diagram of the structure of the PCB circuit board of the gamepad.
Figure 3:
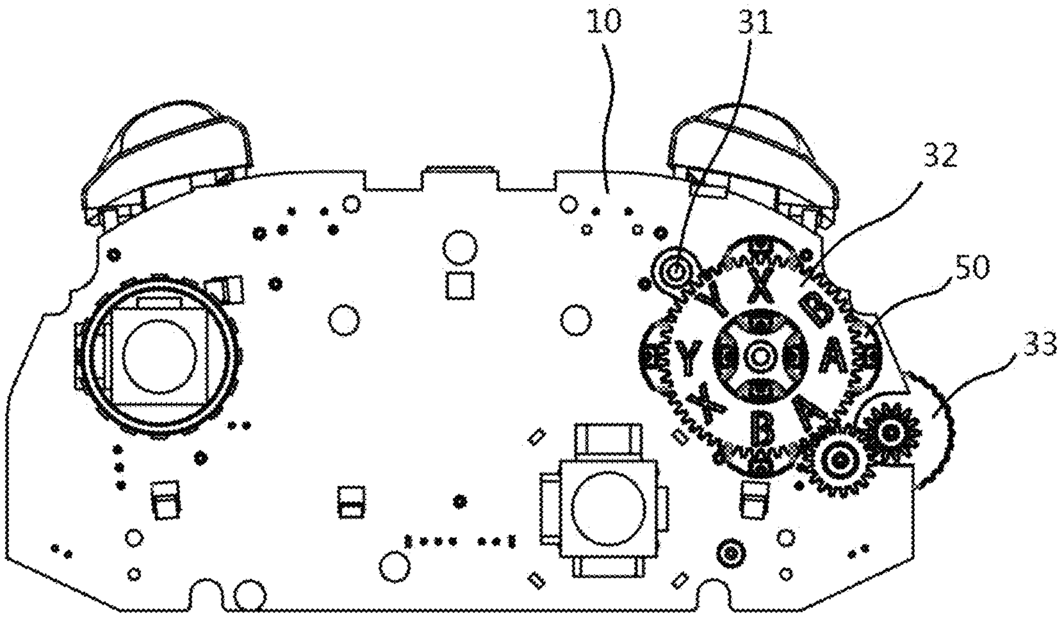
FIG. 3 is a schematic diagram of the structure of the PCB circuit board and key dial assembly of the gamepad.

Referring to FIG. 1 to FIG. 3, the present disclosure provides a gamepad, comprises a PCB circuit board 10, a transparent colloid 20, a key dial assembly 30 and transparent buttons 40.

Specifically, the PCB circuit board 10 is provided with a button position 10*a* and LED lamp beads 10*b* arranged at the button positions 10*a*; the transparent colloid 20 is arranged on the button positions 10*a*; the key dial assembly 30 comprises a support member 31 fixed on the PCB circuit board 10, a dial 32 rotatably connected to the support member 31 and a gear set 30 meshingly connected to the dial 32; the dial 32 is arranged on the transparent colloid 20; the transparent buttons 40 are arranged above the dial 32 and remain relatively stationary with the dial 32. The gear set 30 drives the dial 32 to rotate around the support member 31.

Furthermore, the gear set 30 can be manually moved to drive the dial 32 to rotate around the support member 31. For example, the user can directly rotate the gear set 30 by hand, and at the same time, the dial 32 that is meshedly connected to the gear set 30 rotates around the support member 31.

Alternatively, the gear set 30 rotates under the drive mechanism, and during the rotation process, the gear set 30 drives the dial 32 to rotate around the support member 31. For example, the output end of the motor is connected to the gear set 30, which directly drives the gear set 30 to rotate after the motor is started. At the same time, the dial 32 that is meshedly connected to the gear set 30 rotates around the support member 31.

The dial 32 is provided with several first transparent holes 32*a* and second transparent holes 32*b* adjacent to each of the first transparent holes 32*a*; the first transparent holes 32*a* and the second transparent holes 32*b* correspond to the switching of the button position 10*a* on the PCB circuit board 10 when the dial 32 rotates around the axis of the support member 31.

It can be understood that the light beam of the LED lamp beads 10*b* can be directed to the transparent buttons 40 through the first transparent holes 32*a* or the second transparent holes 32*b* on the dial 32, in order to display the outline of the first transparent holes 32*a* or the second transparent holes 32*b* on the transparent buttons 40. For example, when the first transparent holes 32*a* are of the "X" type, then X are displayed on the transparent buttons 40. Similarly, according to the current host's required key layout, the dial 32 is moved to allow the beam light to pass through the first transparent holes 32*a* or the second transparent holes 32*b* to map the corresponding pattern onto the transparent buttons 40.

Figure 5:
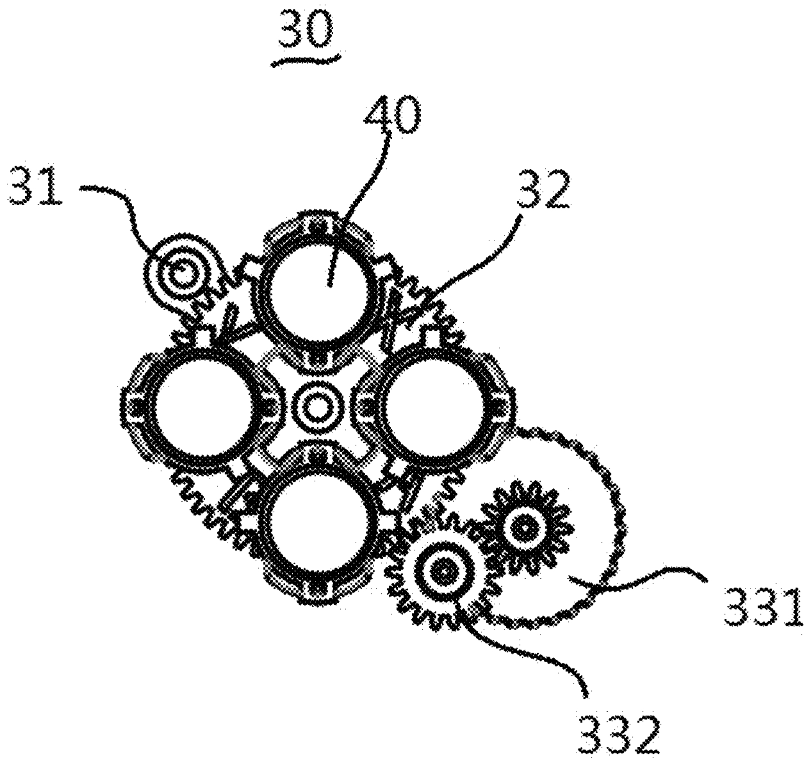
FIG. 5 is a structural schematic diagram of the key dial assembly and the transparent buttons of the gamepad.
Figure 6:
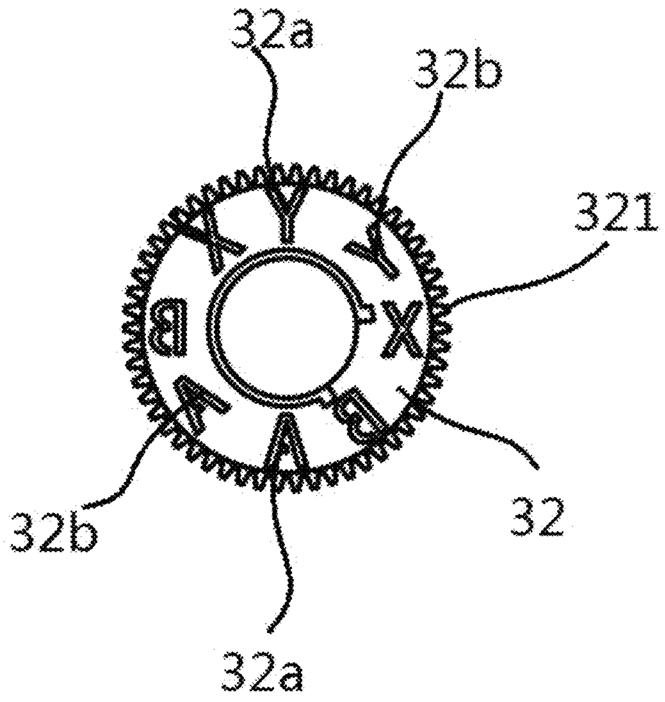
FIG. 6 is a structural schematic diagram of the dial of the key dial assembly of the gamepad.

For example, as shown in FIGS. 3 and 5, the first transparent hole 32*a* are four-letter shaped transparent holes set on the dial 32, consisting of "X", "Y", "A", and "B". Similarly, the second transparent hole 32*b* are four-letter shaped transparent holes set on the dial 32, consisting of "X", "Y", "A", and "B". Moreover, adjacent positions of the "X" first transparent hole 32*a* is arranged with the "Y" second transparent hole 32*b*; The adjacent position of the "Y" first transparent hole 32*a* is arranged with the "X" second transparent hole 32*b*; the second transparent hole 32*b* is arranged adjacent to the first transparent hole 32*a* of "A"; the adjacent position of the "B" first transparent hole 32*a* is arranged with the "A" second transparent hole 32*b*. Therefore, when the dial 32 rotates around the axis relative to the support member 31, the original "X" first transparent hole 32*a* is replaced by the "Y" second transparent hole 32*b*, and so on. The "X" second transparent hole 32*b* replaces the "Y" first transparent hole 32*a*; The second transparent hole 32*b* of "B" replaces the first transparent hole 32*a* of "A"; The second transparent hole 32*b* of "A" replaces the first transparent hole 32*a* of "B". In summary, the original "X", "Y", "A", and "B" button positions 10*a* can be switched.

The gamepad comprises the key dial assembly 30. Specifically, the dial 32 in the key dial assembly 30 is provided with several first transparent holes 32*a* and second transparent holes 32*b* adjacent to each of the first transparent holes 32*a*; the first transparent holes 32*a* and the second transparent holes 32*b* correspond to the switching of the button position 10*a* when the dial 32 is rotated with the axis of the support member 31. The first transparent holes 32*a* or the second transparent holes 32*b* corresponding to the LED lamp beads 10*b* transmission is mapped with the corresponding button pattern on the corresponding transparent buttons 40 to enable switching of button types on the transparent buttons 40, ultimately adapting to different types of game consoles.

Referring to FIG. 5, in this embodiment, the section of the dial 32 is a dental structure 321 with the gear set 30. It can be understood that the dial 32 itself is a gear structure, or similar to a gear structure, capable of meshing with the gear set 30. Meanwhile, according to actual usage requirements, the dental structure 321 is distributed on all or part of the circumferential sidewalls of the dial 32.

Alternatively, in the embodiment, the dial 32 comprises the body of the disc and a gear component coaxial with the body of the disc; the body of the disc is provided with several first transparent holes 32*a* and second transparent holes 32*b*; the gear components are meshedly connected to the gear set 30, and drive the body of the disc to rotate coaxially. It can be understood that the body of the disc and gear components can be integrally formed, or the two can be connected in a detachable manner.

Figure 4:
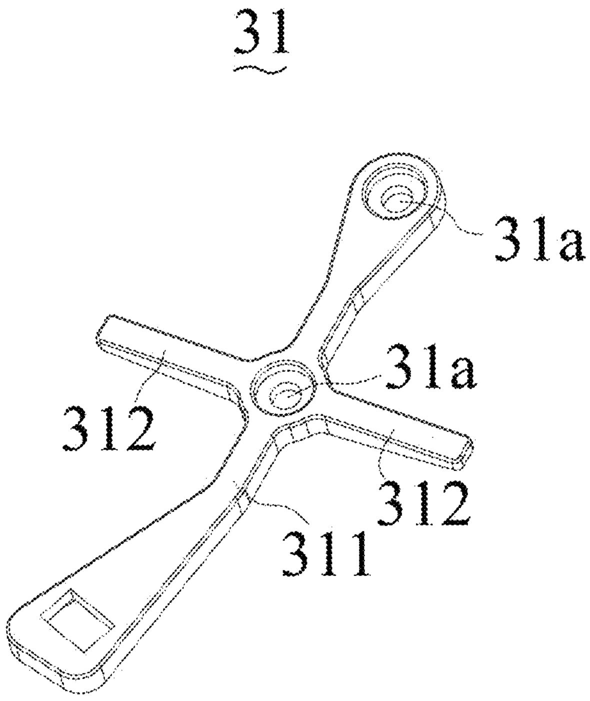
FIG. 4 is a structural schematic diagram of the support member of the key dial assembly of the gamepad.

Referring to FIG. 3 and FIG. 4, the support member 31 comprises a support body 311 fixed on the PCB circuit board 10 and support arms 312 arranged on opposite sides of the support body 311. The body of the disc rotates around the axis around the support body 311 and the support arms 312.

Preferably, the two support arms 312 and the support body 311 form a cross-shaped structure, and the body of the disc is placed on the two support arms 312 and the support body 311, and can slide relative to the support member 31. This structural form of support member 31 can not only support the body of the disc but also have a smaller contact area with the body of the disc to ensure smooth rotation of the body of the disc.

Specifically, referring to FIG. 2 and FIG. 4, the support body 311 is provided with at least two positioning holes 31*a*, and the PCB circuit board 10 is equipped with positioning columns that are suitable for the positioning holes 31*a*. It can be understood that setting two positioning holes 31*a* can effectively limit and support body 311. Preferably, one of the positioning hole 31*a* is located in the middle of the support body 311, and the other positioning hole 31*a* is located at one end of the support body 311.

Referring to FIG. 1, FIG. 3 and FIG. 5, the gamepad comprises a shell 60, and the shell 60 is provided with a through hole communicated externally; the gear set 30 comprises a first sub-gear 331 that is pivoted inside the shell 60 and partially placed outside the through hole, and comprises connecting the first sub-gear 331 and the second sub-gear 332 of the dial 32. It can be understood that the first sub-gear 331 drives the second sub-gear 332 to rotate under the user's movement, ultimately driving the dial 32 to rotate. At the same time, the number of teeth of the first sub-gear 331 and the second sub-gear 332 can be adjusted based on the transmission ratio and distance.

In the embodiment, the PCB circuit board 10 is equipped with a switch, and the LED lamp beads 10*b* are colorful LED lamp beads 10*b*; the switch is electrically connected to the colorful LED lamp beads 10*b*; the switch is turned on or off with the rotation of the dial 32 to enable the switching of the colorful LED lamp beads 10*b* between different colors. It can be understood that there is a linkage relationship between the switch and the dial 32, for example, the dial 32 can trigger switching on during the process.

In order to clearly achieve button switching, the color of the corresponding button is changed after each switch to enable the function of prompt.

For example, the colorful LED lamp beads 10*b* can emit red light or green light independently, that is, in the first mode, the colorful LED lamp beads 10*b* emit red light, making each key of the game handle red, while in the second mode, the colorful LED lamp beads 10*b* emit green light, making each key of the game handle green.

Specifically, as shown in FIGS. 1 and 3, in the embodiment, the number of button positions is four, and each button position is distributed in a cross-shaped; the number of first transparent holes and second transparent holes is both four. It can be understood that in the initial state, the four first transparent holes 32*a* correspond to each button position 10*a*. After a switch, the four second transparent holes 32*b* correspond to each button position 10*a*.

Figure 7:
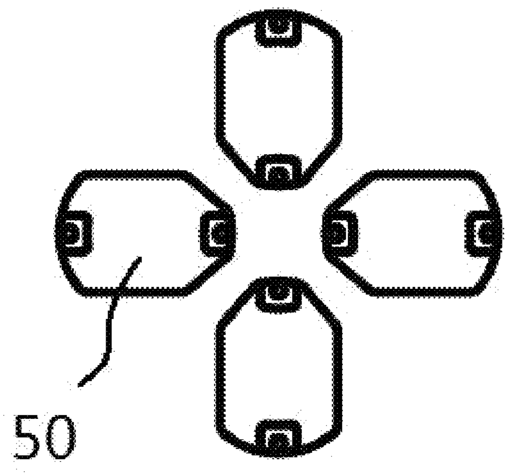
FIG. 7 is a structural schematic diagram of the light guide plate of the gamepad.

Referring to FIG. 3 and FIG. 7, in the embodiment, the gamepad also comprises a light guide plate 50, which is located between the transparent colloid 20 and the dial 32. It can be understood that the light guide plate 50 is used to guide the LED lamp beads 10*b*, avoiding scattering of the LED lamp beads 10*b*.

Specifically, the light guide plate 50 is in a cross-shaped and corresponds to each of the button position 10*a*.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A gamepad, comprising:

a PCB circuit board, a transparent colloid, a key dial assembly and transparent buttons;

the PCB circuit board is provided with a button position and LED lamp beads arranged at the button position;

the transparent colloid is arranged on the button position;

the key dial assembly comprises a support member fixed on the PCB circuit board, a dial rotatably connected to the support member and a gear set meshingly connected to the dial; the dial is arranged on the transparent colloid;

the transparent buttons are arranged above the dial and remain relatively stationary with the dial;

the dial is provided with several first transparent holes and second transparent holes adjacent to each of the first transparent holes; the first transparent holes and the second transparent holes correspond to the switching of the button positions on the PCB circuit board when the dial rotates around the axis of the support member.

2. The gamepad of claim 1, wherein the circumferential sidewall of the dial is provided with a tooth structure that meshes with the gear set.

3. The gamepad of claim 1, wherein the dial comprises the body of the disc and a gear component coaxial with the body of the disc; the body of the disc is provided with several first transparent holes and second transparent holes; the gear components are meshedly connected to the gear set, and drive the body of the disc to rotate coaxially.

4. The gamepad of claim 1, wherein the gamepad comprises a shell, and the shell is provided with a through hole communicated externally; the gear set comprises a first sub-gear that is pivoted inside the shell and partially placed outside the through hole, and comprises a second sub-gear connecting the first sub-gear and the dial.

5. The gamepad of claim 1, wherein the support member comprises a support body fixed on the PCB circuit board and support arms arranged on opposite sides of the support body, the body of the disc rotates around the axis around the support body and the support arms.

6. The gamepad of claim 5, wherein the support body is provided with at least two positioning holes, and the PCB circuit board is equipped with positioning columns that are suitable for the positioning holes.

7. The gamepad of claim 1, wherein the PCB circuit board is equipped with a switch, and the LED lamp beads are colorful LED lamp beads; the switch is electrically connected to the colorful LED lamp beads; the switch is turned on or off with the rotation of the dial to enable the switching of the colorful LED lamp beads between different colors.

8. The gamepad of claim 1, wherein the number of button positions is four, and each button position is distributed in a cross-shaped; the number of first transparent holes and second transparent holes is both four.

9. The gamepad of claim 8, wherein the gamepad also comprises a light guide plate, which is located between the transparent colloid and the dial.

10. The gamepad of claim 9, wherein the light guide plate is in a cross-shaped and corresponds to each of the button position.

* * * * *